United States Patent
Hwang et al.

(10) Patent No.: US 8,223,704 B2
(45) Date of Patent: *Jul. 17, 2012

(54) APPARATUS AND METHOD FOR ASSIGNING SUBCHANNELS IN AN OFDMA COMMUNICATION SYSTEM

(75) Inventors: In-Seok Hwang, Seoul (KR); Soon-Young Yoon, Seongnam-si (KR); Sang-Hoon Sung, Suwon-si (KR); Jae-Hee Cho, Seoul (KR); Hoon Huh, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 674 days.

This patent is subject to a terminal disclaimer.

(21) Appl. No.: 12/363,315

(22) Filed: Jan. 30, 2009

(65) Prior Publication Data

US 2009/0141681 A1    Jun. 4, 2009

Related U.S. Application Data

(63) Continuation of application No. 10/978,670, filed on Nov. 1, 2004, now Pat. No. 7,545,772.

(30) Foreign Application Priority Data

Oct. 31, 2003  (KR) .................................. 2003-77081

(51) Int. Cl.
| | |
|---|---|
| *H04B 7/216* | (2006.01) |
| *H04B 1/00* | (2006.01) |
| *H04B 1/38* | (2006.01) |
| *H04B 1/10* | (2006.01) |
| *H04B 15/00* | (2006.01) |
| *H04J 1/00* | (2006.01) |
| *H04K 1/10* | (2006.01) |
| *H04K 1/02* | (2006.01) |
| *H04W 4/00* | (2009.01) |
| *H04W 36/00* | (2009.01) |

(52) U.S. Cl. ........ 370/329; 370/335; 370/480; 375/146; 375/148; 375/222; 375/254; 375/260; 375/290; 455/422.1; 455/436; 455/501

(58) Field of Classification Search .................. None
See application file for complete search history.

(56) References Cited

U.S. PATENT DOCUMENTS 5,313,461 A    5/1994  Ahl et al.
(Continued)

FOREIGN PATENT DOCUMENTS

EP    0 400 234    12/1990
(Continued)

OTHER PUBLICATIONS

Markarian et al., OFDM Mode for the IEEE 802.16a PHY Draft Standard, IEEE 802.16 Broadband Wireless Access Working Group, May 17, 2001.

(Continued)

*Primary Examiner* — Ian N Moore
*Assistant Examiner* — Eric H Wang
(74) *Attorney, Agent, or Firm* — The Farrell Law Firm, P.C.

(57) ABSTRACT

An apparatus and method for assigning subchannels of a transmitter in a communication system. The method includes dividing an entire frequency band into m subcarrier groups; mapping each of the m subcarrier groups to a subcarrier group index, wherein a subchannel includes n subcarriers selected from each of the m subcarrier groups corresponding to a subcarrier group index sequence; determining that a first data is needed to transmit in a first timing point; and assigning a first subchannel in the first timing point using a first subcarrier group index sequence. The first subcarrier group index sequence is different from a second subcarrier group index sequence used for assigning a second subchannel in a second timing point.

20 Claims, 5 Drawing Sheets

U.S. PATENT DOCUMENTS

| | | | |
|---|---|---|---|
| 7,224,741 B1 * | 5/2007 | Hadad | 375/260 |
| 2001/0055320 A1 | 12/2001 | Pierzga et al. | |
| 2002/0147017 A1 | 10/2002 | Li et al. | |
| 2004/0109419 A1 | 6/2004 | Sano et al. | |
| 2004/0114507 A1 | 6/2004 | Yoo et al. | |
| 2004/0152468 A1 * | 8/2004 | Sebire | 455/450 |
| 2004/0190640 A1 | 9/2004 | Dubuc et al. | |
| 2005/0013279 A1 | 1/2005 | Hwang et al. | |

FOREIGN PATENT DOCUMENTS

| | | |
|---|---|---|
| JP | 11-113049 | 4/1999 |
| JP | 11-215092 | 8/1999 |
| JP | 2000-269929 | 9/2000 |
| JP | 2001-358692 | 12/2001 |
| KR | 1020020076049 | 10/2002 |
| KR | 1020050009583 | 1/2005 |
| KR | 1020060050116 | 2/2006 |
| KR | 1020060092400 | 8/2006 |
| KR | 100650116 | 11/2006 |
| KR | 1020070021914 | 2/2007 |
| RU | 2 103 822 | 1/1998 |
| RU | 2 108 673 | 4/1998 |
| RU | 2 188 516 | 8/2002 |
| WO | WO 02/09455 | 1/2002 |
| WO | WO 03/001696 | 1/2003 |
| WO | WO 03/088537 | 10/2003 |

OTHER PUBLICATIONS

Jon Labs, Text for Clarification of Interleaver for OFDM and OFDMA, Jul. 24, 2003.

* cited by examiner

FIG.1

|  | SYMBOL 0 n=0 | SYMBOL 1 n=1 | SYMBOL 2 n=2 | SYMBOL 3 n=3 | SYMBOL 4 n=4 | SYMBOL 5 n=5 |
|---|---|---|---|---|---|---|
| 0 – 96 | GROUP 0 | GROUP 16 | GROUP 32 | GROUP 48 | GROUP 64 | GROUP 80 |
| 97 – 193 | GROUP 1 | GROUP 17 | GROUP 33 | GROUP 49 | GROUP 65 | GROUP 81 |
| ... | . | . | . | . | . | . |
| 1348 – 1454 | GROUP 14 | GROUP 30 | GROUP 46 | GROUP 62 | GROUP 78 | GROUP 94 |
| 1455 – 1551 | GROUP 15 | GROUP 31 | GROUP 47 | GROUP 63 | GROUP 79 | GROUP 95 |

Rows indexed by SUB CARRIER INDEX; columns indexed by SYMBOL INDEX (n).

APPARATUS AND METHOD FOR ASSIGNING SUBCHANNELS IN AN OFDMA COMMUNICATION SYSTEM

PRIORITY

This application is Continuation of U.S. application Ser. No. 10/978,670, which was filed on Nov. 1, 2004 now U.S. Pat. No. 7,545,772, and claims priority under 35 U.S.C. §119 to an application entitled "Apparatus and Method for Assigning Subchannels in an OFDMA Communication system" filed in the Korean Intellectual Property Office on Oct. 31, 2003 and assigned Serial No. 2003-77081, the contents of which are incorporated herein by reference.

BACKGROUND OF THE INVENTION

1. Field of the Invention

The present invention relates generally to a communication system supporting an Orthogonal Frequency Division Multiple Access (OFDMA) scheme (hereinafter referred to as an "OFDMA communication system"), and in particular, to an apparatus and method for adaptively assigning subchannels.

2. Description of the Related Art

The fourth generation (4G) mobile communication system is in the process of being standardized to provide efficient interworking and integrated service between a wired communication network and a wireless communication network, beyond the simple wireless communication service that the previous-generation mobile communication systems provided. Accordingly, the technology required for transmitting a large volume of data at a same level available in the wired communication network must be developed for the new wireless communication network.

In this context, many studies are being conducted on using an Orthogonal Frequency Division Multiplexing (OFDM) scheme as a scheme for high-speed data transmission over wired/wireless channels in the 4G mobile communication system. The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal subcarriers (or subcarrier channels) before being transmitted.

The first MCM systems appeared in the late 1950's for military high frequency (HF) radio communication, and the OFDM scheme for overlapping orthogonal subcarriers was initially developed in the 1970's. In view of orthogonal modulation between multiple carriers, the OFDM scheme has limitations in its actual implementation. In 1971, Weinstein, et al. proposed that OFDM modulation/demodulation can be efficiently performed using Discrete Fourier Transform (DFT), which was a driving force behind the development of the OFDM scheme. Also, the introduction of a guard interval and a cyclic prefix as the guard interval further mitigates the adverse effects of multipath propagation and delay spread on the systems. As a result, the OFDM scheme has been widely used for digital data communication technologies such as digital audio broadcasting (DAB), digital TV broadcasting, wireless local area network (WLAN), and wireless asynchronous transfer mode (WATM).

Although the hardware complexity was an obstacle to widespread implementation of the OFDM scheme, recent advances in digital signal processing technology including fast Fourier transform (FFT) and inverse fast Fourier transform (IFFT) have enabled the OFDM scheme to be implemented in a less complex manner.

The OFDM scheme, similar to an existing Frequency Division Multiplexing (FDM) scheme, boasts of an optimum transmission efficiency in high-speed data transmission because it can transmit data on subcarriers, while being able to maintain orthogonality among them. The optimum transmission efficiency is further attributed to good frequency use efficiency and robustness against multipath fading in the OFDM scheme. More specifically, overlapping frequency spectrums lead to efficient frequency use and robustness against frequency selective fading and multipath fading. The OFDM scheme reduces the effects of intersymbol interference (ISI) by use of guard intervals and enables the design of a simple equalizer hardware structure. Furthermore, because the OFDM scheme is robust against impulse noise, it is increasingly popular in communication systems.

The OFDMA scheme is a Multiple Access scheme based on the OFDM scheme. In the OFDMA scheme, subcarriers in one OFDM symbol are distributed to a plurality of users, or subscriber stations. A communication system using the OFDMA scheme includes an IEEE 802.16a communication system and an IEEE 802.16e communication system. The IEEE 802.16a communication system is a fixed-Broadband Wireless Access (BWA) communication system using the OFDMA scheme. The IEEE 802.16e communication system is a system that provides for the mobility of subscriber stations in the IEEE 802.16a communication system. Currently, the IEEE 802.16a communication system and the IEEE 802.16e communication system both use 2048-point IFFT and 1702 subcarriers. The IEEE 802.16a communication system and the IEEE 802.16e communication system use 166 subcarriers from among the 1702 subcarriers as pilot subcarriers, and use the remaining 1536 subcarriers, not including the 166 subcarriers, as data subcarriers.

The 1536 data subcarriers are divided into 32 subchannels, each having 48 data subcarriers. The subchannels are assigned to a plurality of users according to system conditions. The term "subchannel" refers to a channel comprised of a plurality of subcarriers. Herein, each subchannel is comprised of 48 subcarriers. The OFDMA communication system distributes all subcarriers, particularly, data subcarriers used over the entire frequency band, thereby acquiring a frequency diversity gain.

A frequency hopping (hereinafter referred to as "FH") scheme is a scheme of changing subcarriers assigned to a specific subscriber station, and an FH-OFDM scheme is a scheme that combines the FH scheme and the OFDM scheme. A system employing the FH-OFDM scheme (hereinafter referred to as an "FH-OFDM system") uses the FH scheme in hopping frequency bands of the subcarriers assigned to the subscriber stations. Therefore, the FH-OFDM system also distributes all of the subcarriers, particularly, data subcarriers used over the entire frequency band, thereby acquiring a frequency diversity gain.

The IEEE 802.16a communication system and the IEEE 802.16e communication system divide a broadband of, for example, 10 MHz into subchannels only in a frequency domain. As indicated above, the IEEE 802.16a communication system and the IEEE 802.16e communication system use a 2048-point IFFT and use 1702 subcarriers per OFDM symbol. When subchannels are assigned using Reed Solomon (RS) sequences, which secures an excellent inter-subchannel collision characteristic in a multi-cell environment, it is possible to identify about 40 cells (e.g., 41*40=1640). For example, when a Reed Solomon sequence defined in a Galois Field Q is used, the number of available subcarriers is defined as Q (Q−1). When about 1600 subcarriers are used as in the 802.16a/e system, 41 is selected from among 37, 41, and 43 which are prime numbers near to 40, so that a system using 1640 subcarriers is generated. However, the 802.16a/e system uses 48 for the number subcarriers per subchannel and thus has an inferior property in collision between subchannels. The Galois Field will be described later in detail.

However, in order to facilitate network design along with the development of communication systems, it is necessary to increase the number of identifiable cells up to 100. The OFDMA scheme has limitations in generating subchannels only in a frequency domain in terms of the number of identifiable cells.

Further, a Flash-OFDM scheme using a narrowband of 1.25 MHz uses 128-point IFFT, and defines 113 hopping sequences that hop different subcarriers for one period comprised of 113 OFDM symbols, as a basic resource assignment unit. A communication system supporting the Flash-OFDM scheme (hereinafter referred to as a "Flash-OFDM communication system") defines different hopping frequencies for 113 cells in designing networks, thereby making it possible to identify 113 different cells. However, the Flash-OFDM scheme, being a narrowband-only scheme, cannot contribute to the required capacity increase.

SUMMARY OF THE INVENTION

It is, therefore, an object of the present invention to provide a subcarrier assignment apparatus and method in an OFDMA communication system.

It is another object of the present invention to provide a time-frequency 2-dimensional subcarrier assignment apparatus and method in an OFDMA communication system.

It is further another object of the present invention to provide a subcarrier assignment apparatus and method for identifying base stations in an OFDMA communication system.

It is yet another object of the present invention to provide a subcarrier assignment apparatus and method for minimizing collisions between subchannels used in neighbor base stations in an OFDMA communication system.

It is yet another object of the present invention to provide a subcarrier assignment apparatus and method for acquiring diversity gain in an OFDMA communication system.

In accordance with an object of the invention, a method of assigning subchannels of a transmitter in a communication system is provided. The method includes: dividing an entire frequency band into m subcarrier groups; mapping each of the m subcarrier groups to a subcarrier group index, wherein a subchannel includes n subcarriers selected from each of the m subcarrier groups corresponding to a subcarrier group index sequence, determining that a first data is needed to transmit in a first timing point; and assigning a first subchannel in the first timing point using a first subcarrier group index sequence. The first subcarrier group index sequence is different from a second subcarrier group index sequence used for assigning a second subchannel in a second timing point, and the first subcarrier group index sequence is generated by interleaving corresponding to: $\Pi(k)=(a*\beta+k)\mod(Q-1)$ for $\beta=0, \ldots, Q-2$, where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

In accordance with another object of the invention, a method of receiving data of a receiver in a communication system is provided. The method includes: dividing an entire frequency band into m subcarrier groups; mapping each of the m subcarrier groups to a subcarrier group index, wherein a subchannel includes n subcarriers selected from each of the m subcarrier groups corresponding to a subcarrier group index sequence; and receiving data using a first subchannel. The first subchannel is assigned in a first timing point using a first subcarrier group index sequence by a transmitter, when the transmitter determines that a first data is to be transmit in the first timing point, the first subcarrier group index sequence being different from a second subcarrier group index sequence used for assigning a second subchannel in a second timing point by the transmitter. The first subcarrier group index sequence is generated by interleaving corresponding to: $\Pi(k)=(a*\beta+k)\mod(Q-1)$ for $\beta=0, \ldots, Q-2$, where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

In accordance with another object of the invention, an apparatus for assigning subchannels in a communication system is provided. The apparatus includes: a subchannel assigner for assigning a first subchannel in a first timing point using a first subcarrier group index sequence when a transmitter determines that a first data is to be transmitted in the first timing point. An entire frequency band is divided into m subcarrier groups, each of the m subcarrier groups is mapped to a subcarrier group index, a subchannel includes n subcarriers selected from each of the m subcarrier groups corresponding to a subcarrier group index sequence. The first subcarrier group index sequence is different from a second subcarrier group index sequence used for assigning a second subchannel in a second timing point, and the first subcarrier group index sequence is generated by interleaving corresponding to: $\Pi(k)=(a*\beta+k)\mod(Q-1)$ for $\beta=0, \ldots, Q-2$, where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

In accordance with another object of the invention, an apparatus for receiving data in a communication system is provided. The apparatus includes: a receiver for receiving a data using a first subchannel. When an entire frequency band is divided into m subcarrier groups, each of the m subcarrier groups is mapped to a subcarrier group index, a subchannel includes n subcarriers selected from each of the m subcarrier groups corresponding to a subcarrier group index sequence. The first subchannel is assigned in a first timing point using a first subcarrier group index sequence by a transmitter when the transmitter determines that a first data is to be transmit in the first timing point, the first subcarrier group index sequence is different from a second subcarrier group index sequence used for assigning a second subchannel in a second timing point by the transmitter, and the first subcarrier group index sequence is generated by interleaving corresponding to: $\Pi(k)=(a*\beta+k)\mod(Q-1)$ for $\beta=0, \ldots, Q-2$, where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

In accordance with another object of the invention, a method of assigning subchannels by a transmitter in a wireless communication system is provided. The method includes: generating subcarrier groups by classifying subcarriers; interleaving at least one of the subcarrier group corresponding to a predetermined interleaving formula; constituting a subchannel using the interleaved subcarrier group; and assigning the constituted subchannel for transmission. The predetermined interleaving formula is expressed as: Π(k)= (a*β+k)mod(Q−1) for β=0, . . . , Q−2, where β represents a subchannel index, k represents locations of the subcarriers included in β subchannel, a represents an integer, and (Q−1) represents a number of subcarriers in each subchannel.

In accordance with another object of the invention, an apparatus for assigning subchannels in a wireless communication system is provided. The apparatus includes: a subchannel assigning means for generating subcarrier groups by classifying subcarriers, constituting a subchannel using at least one interleaved subcarrier group; and assigning the constituted subchannel for transmission; and an interleaving means for interleaving at least one subcarrier group among the generated subcarrier groups corresponding to a predetermined interleaving formula. The predetermined interleaving formula is expressed as: Π(k)=(a*β+k)mod(Q−1) for β=0, . . . , Q−2, where β represents a subchannel index, k represents locations of the subcarriers included in β subchannel, a represents an integer, and (Q−1) represents a number of subcarriers in each subchannel.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention assigns subchannels in a time-frequency 2-dimensional domain in a communication system using an Orthogonal Frequency Division Multiple Access (OFDMA) scheme (hereinafter referred to as an "OFDMA communication system"). Accordingly, the present invention increases the number of identifiable cells, or base stations, in the OFDMA communication system and minimizes collision between subchannels used in neighbor base stations. Each base station can manage one cell or a plurality of cells. However, for ease of description, it will be assumed herein that each base station manages only one cell.

Figure 1:
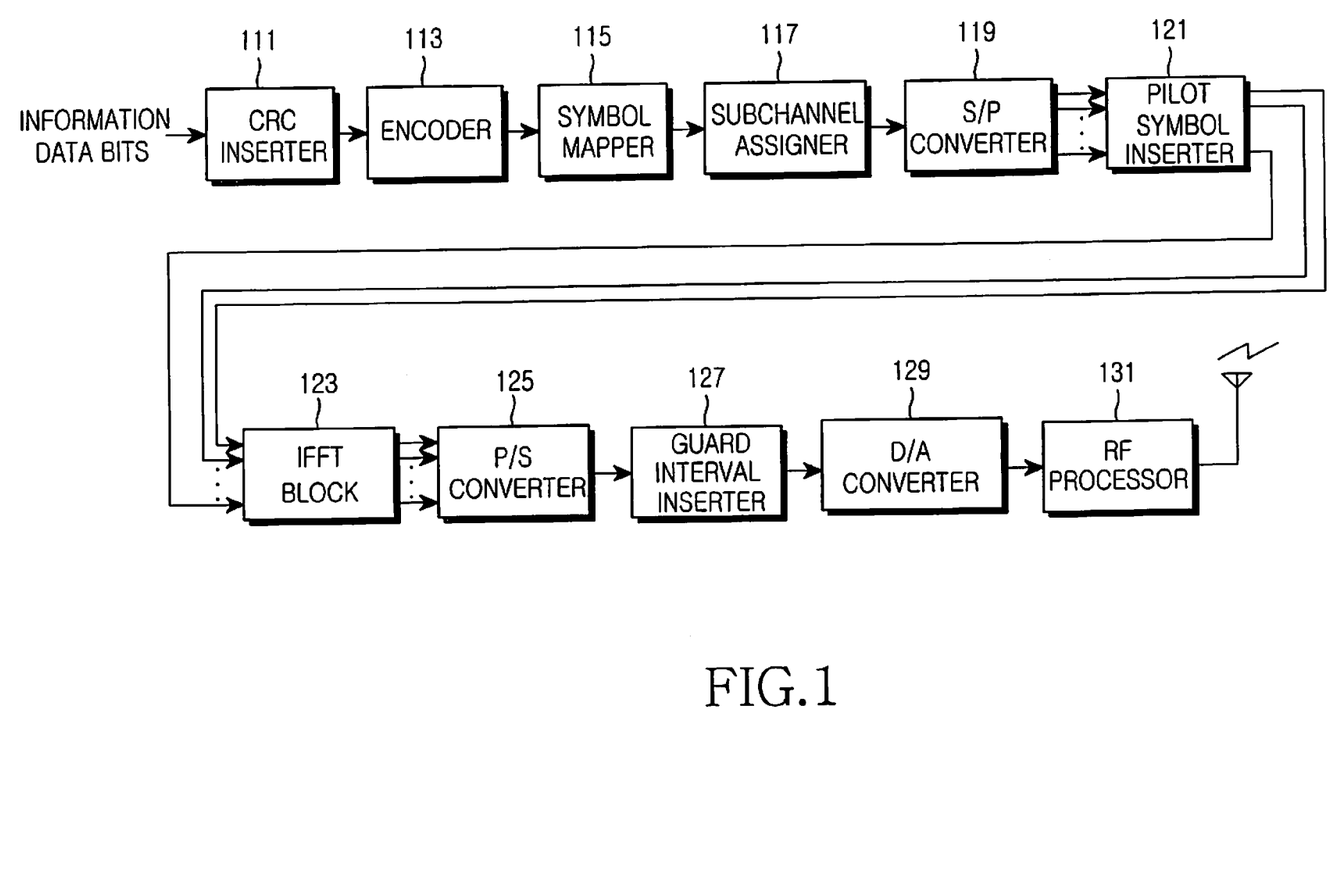
FIG. 1 is a block diagram illustrating a first transmitter in an OFDMA communication system according to an embodiment of the present invention.

FIG. 1 is a block diagram illustrating a first transmitter in an OFDMA communication system according to an embodiment of the present invention. Referring to FIG. 1, a first transmitter of the OFDMA communication system includes a cyclic redundancy check (CRC) inserter 111, an encoder 113, a symbol mapper 115, a subchannel assigner 117, a serial-to-parallel (S/P) converter 119, a pilot symbol inserter 121, an inverse fast Fourier transform (IFFT) block 123, a parallel-to-serial (P/S) converter 125, a guard interval inserter 127, a digital-to-analog (D/A) converter 129, and a radio frequency (RF) processor 131.

When there are user data bits and control data bits to transmit, the user data bits and the control data bits are input to the CRC inserter 111. Herein, the user data bits and the control data bits will be referred to as "information data bits." The CRC inserter 111 inserts CRC bits into the information data bits, and outputs CRC-inserted information data bits to the encoder 113. The encoder 113 encodes the signal output from the CRC inserter 111 using a predetermined coding technique, and outputs the encoded signal to the symbol mapper 115. Preferably, turbo coding or convolutional coding is used as the coding technique.

The symbol mapper 115 modulates the coded bits output from the encoder 113 into modulation symbols using a predetermined modulation technique, and outputs the modulation symbols to the subchannel assigner 117. Preferably, quadrature phase shift keying (QPSK) or 16-ary quadrature amplitude modulation (16QAM) is used as the modulation technique. The subchannel assigner 117 assigns subchannels by receiving the modulation symbols output from the symbol mapper 115, and outputs the subchannel-assigned modulation symbols to the serial-to-parallel converter 119. An operation of assigning subchannels in the subchannel assigner 117 is performed in a subchannel assignment method proposed by the present invention, which will be described in more detail herein below.

The serial-to-parallel converter 119 parallel-converts the subchannel-assigned serial modulation symbols output from the subchannel assigner 117, and outputs the parallel-converted modulation symbols to the pilot symbol inserter 121. The pilot symbol inserter 121 inserts pilot symbols into the parallel-converted modulation symbols output from the serial-to-parallel converter 119, and outputs the pilot-inserted modulation symbols to the IFFT block 123.

The IFFT block 123 performs N-point IFFT on the pilot-inserted modulation symbols output from the pilot symbol inserter 121, and outputs the IFFT-processed modulation symbols to the parallel-to-serial converter 125. The parallel-to-serial converter 125 serial-converts the IFFT-processed parallel modulation symbols, and outputs the serial-converted modulation symbols to the guard interval inserter 127. The guard interval inserter 127 inserts a guard interval signal into the serial-converted modulation symbols, and outputs the guard interval-inserted modulation symbols to the digital-to-analog converter 129. The guard interval is inserted to remove interference between a previous OFDM symbol transmitted at a previous OFDM symbol time and a current OFDM symbol to be transmitted at a current OFDM symbol time in an OFDM communication system. Generally, null data is inserted into the guard interval. In this case, however, when a receiver incorrectly estimates a start point of an OFDM symbol, interference occurs between subcarriers, causing an increase in incorrect estimation rates for the received OFDM symbol. Therefore, a cyclic prefix method or a cyclic postfix method is used. In the cyclic prefix method, a predetermined number of last samples of an OFDM symbol in a time domain are copied and inserted into a valid OFDM symbol, and in the cyclic postfix method, a predetermined number of first samples of an OFDM symbol in a time domain are copied and inserted into a valid OFDM symbol.

The digital-to-analog converter 129 analog-converts the signal output from the guard interval inserter 127, and outputs the analog-converted signal to the RF processor 131. The RF processor 131, including a filter and a front-end unit, RF-processes the signal output from the digital-to-analog converter 129 such that the signal, and transmits the RF-processed signal over the air via a transmission antenna.

(1) Subchannel Assignment in a Time-Frequency 2-Dimensional Domain

Indexes of the subcarriers included in a subchannel are assigned using a Reed Solomon (RS) sequence, and the subchannel is generated using subcarriers corresponding to the assigned subcarrier indexes. All subcarriers included in the OFDMA communication system are divided into (Q−1) groups, and each of the (Q−1) groups has Q consecutive subcarriers.

The Reed Solomon sequence is defined in a Galois Field. A Galois Field (Q) is comprised of Q elements of $\{0, 1, 2, \ldots, Q-1\}$. Here, Q denotes a size of the Galois Field, and when the Q is a prime number, an addition operation and a multiplication operation in the Galois Field (Q) are defined as shown below in Equation (1).

$$a+b=(a+b)\bmod Q, \text{for } a,b \in 0,1,2,\ldots,Q-1$$

$$a*b=(a*b)\bmod Q, \text{for } a,b \in 0,1,2,\ldots,Q-1 \quad (1)$$

A sequence S defined in the Galois Field (Q) is a subchannel sequence, assigned to each of the (Q−1) groups, indicating positions of subcarriers included in a subchannel. Indexes of the subcarriers included in a subchannel are expressed in Equation (2).

$$\text{Subcarrier\_index}(i)=Q*i+S(i) \quad (2)$$

In Equation (2), 'i' denotes a group index indicating a particular group from among all of the (Q−1) groups of the OFDMA communication system. The group index 'i' has any one of the values $0, 1, \ldots, Q-2$. Further, $S(i)$ denotes an $(i+1)^{th}$ element in a sequence S, and represents the positions of the subcarriers in the corresponding group.

If the sequence of Equation (2), i.e., the sequence representing the indexes of the subcarriers included in a subchannel, is defined, a subchannel corresponding to the sequence can also be defined. For example, if it is assumed that the number of all subcarriers of the OFDMA communication system is 42 of $\{0, 1, 2, \ldots, 41\}$, the 42 subcarriers can be divided into 6 groups. In addition, 6 subcarriers included in a particular subchannel can be assigned using a length-6 sequence. That is, if indexes of $\{3, 2, 6, 4, 5, 1\}$ are given for a subchannel sequence S, a corresponding subchannel is generated using sequences having indexes $\{3, 9, 20, 25, 33, 36\}$ of subcarriers.

In addition, the permutation and the offset for a basic sequence are used for identifying a particular base station and the subchannels in the base station. Herein, the basic sequence is defined as $S_0$, and the basic sequence $S_0$ is expressed as shown in Equation (3).

$$S_0=\alpha,\alpha^2,\alpha^3,\ldots,\alpha^{Q-2},\alpha^{Q-1} \quad (3)$$

In Equation (3), $\alpha$ denotes a primitive element of the Galois Field (Q) ($\alpha^m \neq 1$ for $m<Q-1, \alpha^{Q-1}=1$). If a size Q of the Galois Field is 7 (Q=7), the primitive element $\alpha$ becomes 3 and $S_0=\{3, 3^2, 3^3, \ldots, 3^5, 3^6\} \bmod 7=\{3, 2, 6, 4, 5, 1\}$. Here, the basic sequence $S_0$ represents a sequence assigned to a subchannel #0 for a reference base station from among a plurality of base stations included in the OFDMA communication system. It is assumed herein that the reference base station is a base station #0 and the base station #0 becomes a first base station from among the base stations constituting the OFDMA communication system. Also, the subchannel #0 becomes a first subchannel from among the Q subchannels.

A sequence $S_m$ assigned to a cell #m is a sequence determined by permuting the basic sequence $S_0$ m times. The sequence $S_m$ is expressed as shown in Equation (4).

$$S_m=\alpha^m S_0=\alpha^{Q-m},\alpha^{Q-m+1},\ldots,\alpha^{Q-2},\alpha^{Q-1},\alpha,\alpha^2,\ldots,\alpha^{Q-m-1} \quad (4)$$

In Equation (4), $S_m$ denotes a sequence assigned to a subchannel #0 of a base station #m.

In addition, a sequence $S_{m,\beta}$ for defining subchannels in the base station #m become a sequence determined by adding an offset $\beta$ to a sequence $S_m$ assigned to a subchannel #0 of the cell #m. The sequence $S_{m,\beta}$ for defining subchannels in the base station #m is expressed in Equation (5) below.

$$S_{m,\beta}=S_m+\beta,\beta,\beta,\ldots,\beta,\beta;\beta \in GF(Q) \quad (5)$$

In Equation (5), GF(Q) denotes Galois Field(Q).

Accordingly, it is possible to assign subchannels to all of the (Q−1) base stations of the OFDMA communication system. Therefore, it is possible to obtain Q subchannel sequences for each of the (Q−1) base stations. The obtained subchannel sequences are advantageous in that a maximum of only one subchannel may possibly collide between neighbor base stations, thereby preventing a deterioration in system performance due to subchannel collision.

Referring to Table 1 and Table 2, a description will now be made of base station sequences for a subchannel #0 and sequences for designating subchannels in a base station #0, when a size Q of the Galois Field is 7 (Galois Field (Q)=7), a primitive element of the Galois Field is 3 ($\alpha=3$), and basic sequence $S_0=\{3, 2, 6, 4, 5, 1\}$.

TABLE 1

| | | | | | | |
|---|---|---|---|---|---|---|
| $S_0$ | 3 | 2 | 6 | 4 | 5 | 1 |
| $S_1$ | 1 | 3 | 2 | 6 | 4 | 5 |
| $S_2$ | 5 | 1 | 3 | 2 | 6 | 4 |
| $S_3$ | 4 | 5 | 1 | 3 | 2 | 6 |
| $S_4$ | 6 | 4 | 5 | 1 | 3 | 2 |
| $S_5$ | 2 | 6 | 4 | 5 | 1 | 3 |

TABLE 2

| | | | | | | |
|---|---|---|---|---|---|---|
| $S_{0,0}$ | 3 | 2 | 6 | 4 | 5 | 1 |
| $S_{0,1}$ | 4 | 3 | 0 | 5 | 6 | 2 |
| $S_{0,2}$ | 5 | 4 | 1 | 6 | 0 | 3 |
| $S_{0,3}$ | 6 | 5 | 2 | 0 | 1 | 4 |
| $S_{0,4}$ | 0 | 6 | 3 | 1 | 2 | 5 |
| $S_{0,5}$ | 1 | 0 | 4 | 2 | 3 | 6 |
| $S_{0,6}$ | 2 | 1 | 5 | 3 | 4 | 0 |

Table 1 illustrates sequences for assigning a subchannel #0 of different cells using permutation, and Table 2 illustrates sequences for assigning subchannels in a base station #0 by adding an offset to the indexes of the subchannels in a base station. As illustrated in Table 1, a maximum of only one subchannel may possibly collide, thereby preventing a reduction in the system performance due to subchannel collision. However, unlike this, it is possible to identify the subchannels in a base station by permuting a basic sequence as illustrated in Table 1, and it is also possible to generate different sequences for identifying the base stations by adding an offset to the basic sequence as illustrated in Table 2.

In a cellular communication system in which a frequency reuse rate is 1, it is necessary to increase the total number of identifiable base stations in the system to facilitate the installation of the base stations when designing the networks. In order to increase the number of identifiable base stations, it is necessary to increase a value Q of the Galois Field (Q). In order to increase the number of identifiable base stations, the present invention proposes a 2-dimensional subchannel assignment method considering not only a frequency domain but also a time domain. For example, assuming that 97*16=1552 subcarriers are transmitted per OFDM symbol, if six OFDM symbols are used as one subcarrier assignment unit, it can be determined that 97*16*6=97*96 data subcarriers are used. In this case, if the subchannel sequence is defined on the Galois Field (97), 97 subchannels can be assigned in each of 96 cells. A basic sequence $S_0$ using a primitive element of 5 on the Galois Field (97) can be calculated by substituting Q=97 and $\alpha$=5 in Equation (3), and the basic sequence $S_0$ is expressed as shown below in Equation (6).

$$S_0 = \begin{matrix} \{5, 25, 28, 43, 21, 8, 40, 6, 30, 53, 71, 64, 29, 48, 46, \\ 36, 83, 27, 38, 93, 77, 94, 82, 22, 13, 65, 34, 73, 74, \\ 79, 7, 35, 78, 2, 10, 50, 56, 86, 42, 16, 80, 12, 60, 9, \\ 45, 31, 58, 96, 92, 72, 69, 54, 76, 89, 57, 91, 67, 44, \\ 26, 33, 68, 49, 51, 61, 14, 70, 59, 4, 20, 3, 15, 75, 84, \\ 32, 63, 24, 23, 18, 90, 62, 19, 95, 87, 47, 41, 11, 55, \\ 81, 17, 85, 37, 88, 52, 66, 39, 1\} \end{matrix} \quad (6)$$

Figure 2:
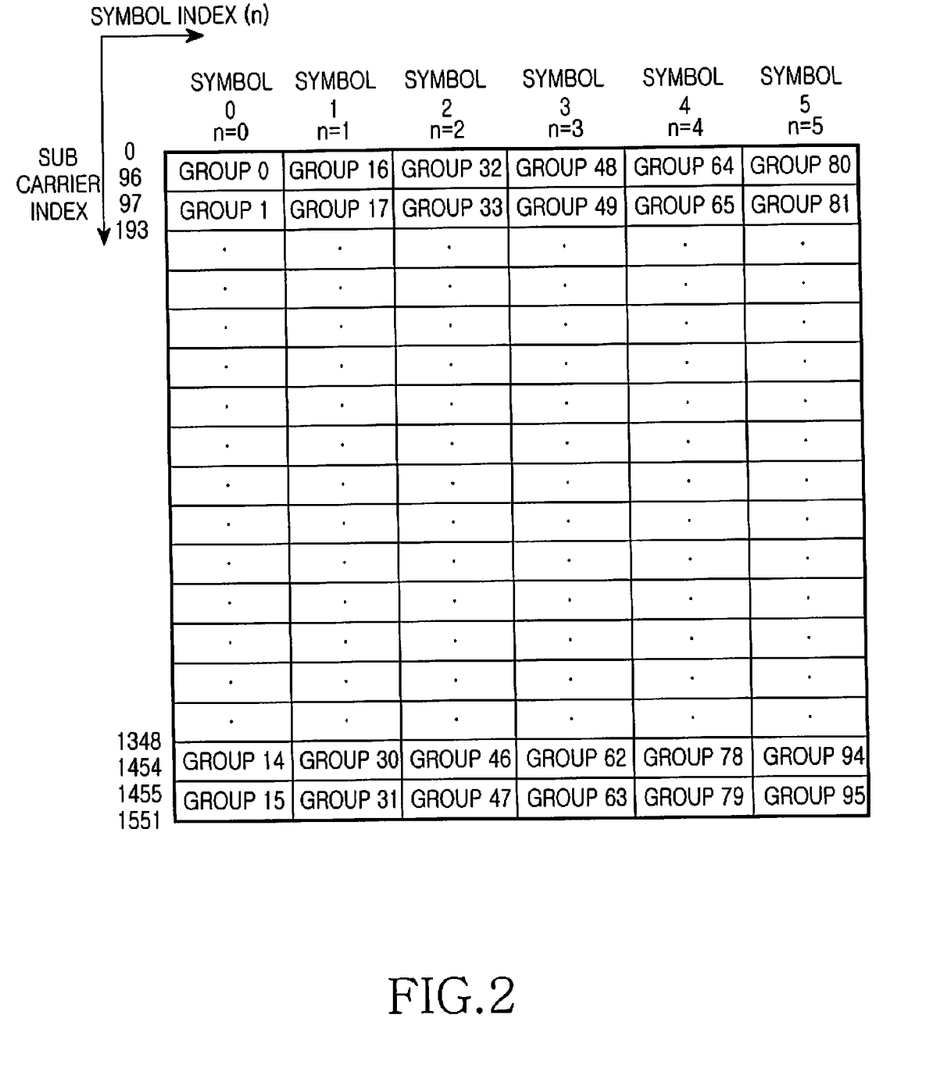
FIG. 2 illustrates a process of assigning subchannels in a time-frequency 2-dimensional domain according to an embodiment of the present invention.

FIG. 2 is a diagram illustrating a process of assigning subchannels in a time-frequency 2-dimensional domain according to an embodiment of the present invention. Before a description of FIG. 2 is given, it will be assumed for the example herein that 96 base stations can be identified in an OFDMA communication system and the subcarriers are assigned such that 97 subchannels can be identified for each of the 96 base stations. That is, as illustrated in FIG. 2, 97*96 subcarriers are divided into 96 groups for 6 OFDM symbol periods in a time-frequency domain, and 97 consecutive subcarriers are arranged in each of the 96 groups. In FIG. 2, the rows denote indexes of subcarriers, and the columns denote symbol indexes of OFDM symbols in a time domain.

In FIG. 2, because a size Q of the Galois Field is 97 (Q=97), a sequence ($\{S_{m,\beta}\}$, for $0 \leq m \leq 95$ and $0 \leq \beta \leq 96$) for defining subchannels in a base station #m can be generated using Equations (4) and (5) and the basic sequence $S_0$ of Equation (6). As a result, 97 subchannels can be assigned to each of 96 base stations.

In the OFDMA communication system, if Q(Q−1) subcarriers in multiple OFDM symbol period are used, N groups are generated using Q*N subcarriers in on OFDM symbol, and if (Q−1)/N OFDM symbols are used, indexes of subcarriers constituting each of the subchannels are expressed as shown in Equation (7)

$$\text{Subcarrier\_index}(n;i) = Q^*(i - N^*\lfloor i/N \rfloor) + S_{m,\beta}(i); n = \lfloor i/N \rfloor \quad (7)$$

In Equation (7), $\lfloor x \rfloor$ represents a maximum integer, which is less than or equal to a value 'x'. In FIG. 2, because Q=97 and N=16, the group index 'i' has any one of the values of 0 to Q−2, i.e., 0 to 95, and the symbol index 'n' has any one of the values of 0 to 5. For example, subcarrier indexes for a subchannel #0 of a base station #0 are Symbol 0: 5, 122, 222, 334, 409, 493, 622, 685, 806, 926, 1041, 1131, 1193, 1309, 1404, 1491

Symbol 1: 83, 124, 232, 384, 465, 579, 664, 701, 789, 938, 1004, 1140, 1238, 1340, 1365, 1490

Symbol 2: 78, 99, 204, 341, 444, 571, 624, 695, 856, 885, 1030, 1076, 1209, 1292, 1416, 1551

Symbol 3: 92, 169, 263, 345, 464, 574, 639, 770, 843, 917, 996, 1100, 1232, 1310, 1409, 1516

Symbol 4: 14, 167, 253, 295, 408, 488, 597, 754, 860, 905, 1033, 1091, 1187, 1279, 1448, 1517

Symbol 5: 19, 192, 281, 338, 429, 496, 637, 760, 793, 958, 1007, 1155, 1216, 1327, 1397, 1456

If the subcarriers are assigned in this manner, a collision might only occur in a maximum of only one subchannel from among the subchannels belonging to different cells as described above, and the collision rate is much lower than that in the existing communication systems. For example, the IEEE 802.16a communication system can assign 32 subchannels for each cell, and subchannels from different cells suffer collision in 0 to 5 subcarrier positions. When subcarriers are assigned as described in the present invention, the number of collisions between subcarriers constituting subchannels is reduced to 0 or 1.

For example, when the Reed Solomon sequence is used, because each subchannel has (Q−1) subcarriers and the number of collisions of subcarriers constituting subchannels for different cells is a maximum of 1, a ratio of collided subcarriers becomes a maximum of 1/(Q−1) and this value is reduced as the value Q increases. Therefore, the time-frequency 2-dimensional subcarrier assignment scheme proposed in the present invention can advantageously increase the number of identifiable cells and minimize a ratio of collided subcarriers.

(2) Subchannel Assignment for Data Transmission

A transmitter, or a base station, of the OFDMA communication system transmits data by assigning a part of one subchannel or at least one subchannel according to a decoding delay time and the amount of transmission data. For example, for the data transmission, a total of Q data assignment units can be generated by inserting the transmission data on a subchannel basis. Here, the "data assignment unit" refers to a resource assignment unit using the same channel coding scheme and modulation scheme. It will be assumed that ½ turbo coding is used as the channel coding scheme and QPSK is used as the modulation scheme.

Generally, a coding gain increases as a length of a codeword becomes longer. For example, if a size of information bits included in the codeword becomes greater than 1000 bits, performance saturation occurs. Therefore, when 96 subcarriers are used per subchannel and QPSK and ½ channel coding are used as a modulation scheme and a coding scheme, channel coding should be performed on about every 10 subchannels in order to maximize a coding gain.

Figure 3:
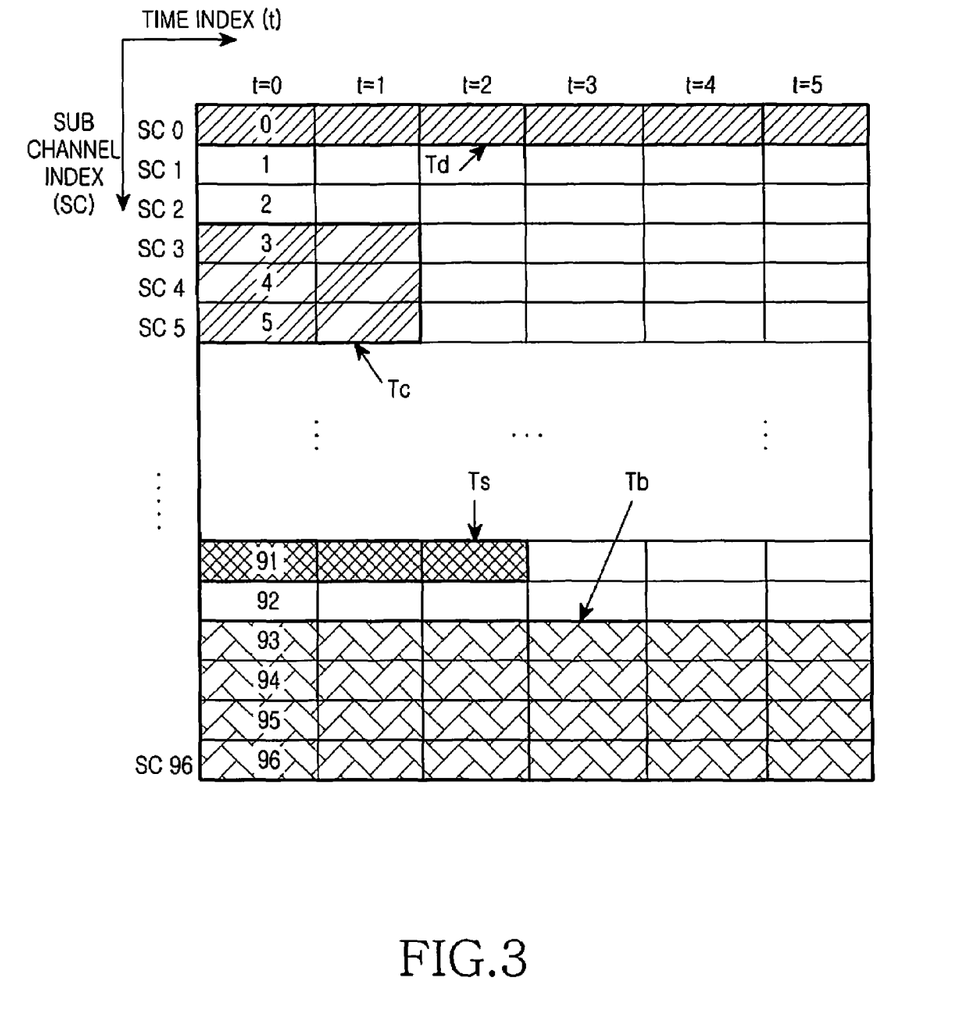
FIG. 3 illustrates a process of assigning subchannels for data transmission according to an embodiment of the present invention.

FIG. 3 is a diagram illustrating a process of assigning subchannels for data transmission according to an embodiment of the present invention. However, before a description of FIG. 3 is given, as indicated above, it will also be assumed herein that 96 base stations can be identified in an OFDMA communication system, and the subcarriers are assigned such that 97 subchannels can be identified for each of the 96 base stations. FIG. 3 illustrates an example where subchannels are properly assigned according to their objects when the number of identifiable subchannels in one cell is 97, i.e., Q=97.

Referring to FIG. 3, a unit rectangle is comprised of 16 subcarriers, and the unit rectangles are grouped for a 6-OFDM symbol period in a time axis, thereby generating one subchannel, which is represented by Td. Here, a unit rectangle representing 16 subcarriers, which are partial subcarriers included in the subchannel, will be referred to as a "subchannel unit." One subchannel includes 6 subchannel units.

When there is a large amount of transmission data, two or more subchannels can be grouped to transmit the data. In FIG.

3, the subchannels used for the data transmission are represented by Tb. That is, 4 subchannels of a subchannel 93 (SC 93) to a subchannel 96 (SC 96) are used to transmit the data. The maximum number of collisions between the subcarriers included in the subchannel unit is equal to the number of subchannel indexes used in a frequency domain. For the subchannel represented by Td and the partial subchannel (3 subchannel units) represented by Ts, the number of subcarrier collisions between neighbor cells is a maximum of 1, and for the subchannel units of different subchannels represented by Tc and the subchannels represented by Tb, the maximum number of collisions can become a maximum of 3 or 4.

A description will now be made herein below of a relationship between the maximum number of collisions for each subchannel and a decoding delay. The subchannels represented by Td and the subchannel units of different subchannels represented by Tc use the same area, i.e., the same number of subcarriers, and for the subchannels represented by Td, a maximum of one collision with subchannels Td of neighbor cells occurs and a decoding delay becomes 6 OFDM symbols. For the subchannel units of different subchannels represented by Tc, a maximum of three collisions with subchannel units of different subchannels Tc of neighbor cells occurs and a decoding delay becomes 2 OFDM symbols.

More specifically, in a 2-dimensional domain of a subchannel index SC and a time index t, a trade-off relation exists between the maximum number of collisions for subcarriers constituting the subchannel unit and a decoding delay. When data is transmitted for a time period that is shorter than a 6-OFDM symbol period, a coding rate must be increased. When subchannel units of different subchannels represented by Tc, i.e., a subchannel #3, a subchannel #4, and a subchannel #5, are used for 2 OFDM symbols, and a subchannel unit represented by Ts, i.e., a subchannel #91, is used for 3 OFDM symbols, it is effective to transmit data, which is relatively short in length and needs a short decoding delay. For example, the data that is relatively short in length and needs a short decoding delay includes paging channel data. As described above, how to use a subchannel in a 2-dimensional domain of a subchannel index SC and a time index t, i.e., which subchannel is to be assigned for transmission of particular data, is determined according to how a control channel and a data channel are formed in the OFDMA communication system.

(3) Subchannel Assignment Scenario in Cellular Environment

Figure 4:
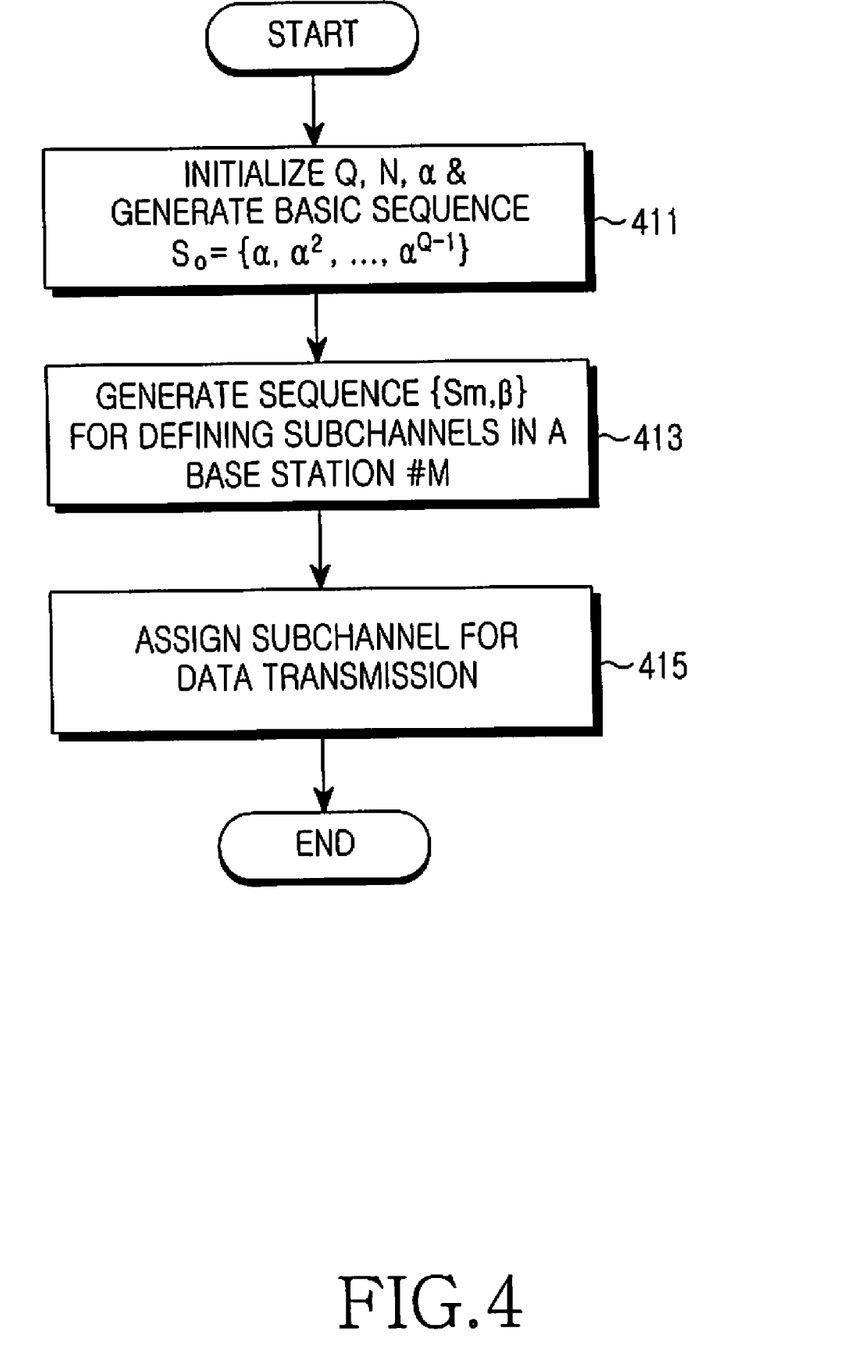
FIG. 4 is a flowchart illustrating a subcarrier assignment procedure according to an embodiment of the present invention.

FIG. 4 is a flowchart illustrating a subcarrier assignment procedure according to an embodiment of the present invention. Referring to FIG. 4, in step 411, a base station initializes parameters necessary for assigning subcarriers, i.e., a parameter Q representing a size of the Galois Field, a parameter N representing the number of groups in one OFDM symbol, and a parameter $\alpha$ representing a primitive element of the Galois Field(Q). Further, the base station generates a basic sequence $S_0$ using the initialized parameters Q, N, and $\alpha$. A process of generating the basic sequence $S_0$ has been described above with reference to FIG. 3.

In step 413, the base station generates a sequence $\{S_{m,\beta}\}$ for defining the subchannels in a base station to which the subcarriers should be assigned, for example, a base station #m. A process of generating a sequence $\{S_{m,\beta}\}$ for defining subchannels in a base station #m, as described with reference to Equation (4) and Equation (5), includes a first step of generating a sequence $S_m$ obtained by permuting the basic sequence $S_0$ generated in step 411 m times, and a second step of generating the sequence $\{S_{m,\beta}\}$ for defining subchannels in the base station #m. The process of generating the sequence $\{S_{m,\beta}\}$ for defining the subchannels in the base station #m has been described above with reference to Equation (4) and Equation (5). The base station can perform the operation of step 413 each time a corresponding situation occurs, or according to corresponding data read from a data table in which situation data is previously stored.

In step 415, the base station assigns the subchannels for the data transmission considering the transmission data. Here, the base station assigns subchannels to be used for the data transmission using the rule described in conjunction with Equation (7), and a detailed description thereof will be omitted herein.

(4) Pilot Channel Generation Method in Cellular Environment

Generally, in a cellular communication system, the pilot subcarriers are used for channel estimation and cell identification, and the present invention proposes a scheme for using a part of the subchannels as pilot channels. In the OFDMA communication system, in order to maintain a collision characteristic between subchannels, positions of the subcarriers constituting each of the subchannels should not be changed even after the pilot subcarriers are inserted into the subchannels.

Therefore, the present invention proposes a scheme for using some of the subchannels defined in a time-frequency 2-dimensional domain as pilot channels. When some of the subchannels are used as pilot channels, a maximum of one collision of the subcarriers occurs between the subchannels assigned to the pilot channels, such that the proposed scheme is very effective for a cellular system in which a frequency reuse rate is 1. In addition, a subscriber station can identify cells depending on a pattern of the pilot subcarriers during an initial cell search or handoff.

Further, the subscriber station can determine a relative signal level of a neighbor cell using the pilot subcarriers. That is, because positions of pilot subcarriers are different for each cell, the subscriber station can perform a cell search depending on the positions of the boosted pilot subcarriers rather than the data subcarriers. Here, the pilot subcarriers are boosted by 3 to 6 [dB] over the data subcarriers, enabling the subscriber station to easily identify the pilot subcarriers. That is, the pilot signal becomes a kind of a reference signal for base station identification and channel estimation.

(5) Subchannel Assignment Scheme for Acquisition of Diversity Gain

In the OFDMA communication system, the same codeword as a previously transmitted codeword may be retransmitted at a next point in time, i.e., the same codeword as a previously transmitted codeword may be separated in time domain and retransmitted as an individual signal, or the same codeword may be repeatedly transmitted at the same point in time. For example, the OFDMA communication system employs a preamble sequence for the acquisition of the synchronization between a base station and a subscriber station and the codewords having the same length are repeated in the preamble sequence. Therefore, the same code word may be repeatedly transmitted as described above in the OFDMA system. Also, when a previously transmitted codeword was erroneous, the same code may be retransmitted.

The present invention proposes a subchannel assignment scheme for the acquisition of a diversity gain in a time domain and a frequency domain for the cases of retransmitting or repeatedly transmitting the same codeword as described above. Specifically, in order to acquire the diversity gain, the present invention employs a subchannel having a structure, which enables the bits of each of the repetitive same codewords to be transmitted by subcarriers of different subcarrier groups. Further, in order to acquire the diversity gain, the present invention employs a subchannel having a structure which enables bits of a retransmitted codeword to be transmitted by a subcarrier of a subcarrier group that is different from the subcarrier group to which the subcarrier having carried the previously transmitted codeword belongs.

According to the present invention, in order to acquire the diversity gain, a subcarrier group of subcarriers is randomly set whenever a subchannel is generated by the subcarriers, as different from the subchannel generation method described above with reference to FIG. 2.

In other words, in the subchannel generation method described above with reference to FIG. 2, indexes of the subcarrier groups to which each of the 96 subcarriers constituting a subchannel $\beta$ belongs when the subchannel $\beta$ is assigned for a predetermined reference period of time (e.g. 6 OFDM symbol periods as shown in FIG. 2) to a predetermined base station at a predetermined point in time are the same as indexes of subcarrier groups to which each of the 96 subcarriers constituting a subchannel $\beta$ belongs when the subchannel $\beta$ is assigned at a point in time just next to the predetermined point in time.

In contrast, according to the present invention, indexes of subcarrier groups are randomly interleaved, so that indexes of subcarrier groups to which each of the 96 subcarriers constituting a subchannel $\beta$ belongs when the subchannel $\beta$ is assigned at a predetermined point in time become different from indexes of subcarrier groups to which each of the 96 subcarriers constituting the subchannel $\beta$ belongs when the subchannel $\beta$ is assigned at a point in time just next to the predetermined point in time.

For example, if the indexes of subcarrier groups of the 96 subcarriers constituting a subchannel $\beta$ assigned at a predetermined time point are 0, 1, 2, 3, . . . , 93, 94, and 95, the indexes of the subcarrier groups of the 96 subcarriers constituting the subchannel $\beta$ assigned at a point in time just next to the predetermined point in time are controlled to be 1, 2, 3, 4, . . . , 94, 95, and 0. For another example, if the indexes of the subcarrier groups of the 96 subcarriers constituting a subchannel $\beta$ assigned at a predetermined point in time are 0, 1, 2, 3, . . . , 93, 94, and 95, the indexes of the subcarrier groups of the 96 subcarriers constituting the subchannel $\beta$ assigned at a point in time just next the predetermined point in time are controlled to be 3, 11, 1, 7, . . . , 90, 78, and 36.

In the first example, the subchannel assignment is performed by cyclic-shifting the indexes of the subcarrier groups of the subcarriers constituting the subchannel to acquire the diversity gain. In contrast, in the second example, the subchannel assignment is performed by randomly generating the indexes of the subcarrier groups of the subcarriers constituting the subchannel to acquire the diversity gain.

As described above, according to the present invention, the indexes of the subcarrier groups of the subcarriers constituting the subchannel are changed whenever the subchannel is assigned, so as to acquire the diversity gain.

Instead of changing the indexes of the subcarrier groups whenever the subchannel is assigned as described above, an interleaver may be used within the scope of the present invention. That is to say, a subchannel may be assigned according to the method described with reference to FIG. 2 and the indexes of the subcarrier groups of the subcarriers constituting the subchannel may then be interleaved by an interleaver (not shown), so as to acquire the diversity gain. Specifically, an interleaver may be interposed between the subchannel assigner 117 and the serial-to-parallel converter 119 shown in FIG. 1, so that the interleaver interleaves the indexes of the subcarrier groups of the subcarriers constituting the subchannel having been assigned by the subchannel assigner 117.

In short, bits of the same codeword must be transmitted by the subcarriers belonging to different subcarrier groups in order to acquire diversity gain in a time domain and a frequency domain when the same codeword is retransmitted or repetitively transmitted as described above. In such a case, the codeword is usually interleaved at a bit level to acquire the desired diversity. However, the present invention proposes a method of changing the group indexes as shown in FIG. 2 for every subchannel in the subchannel assigner 117. This operation can be explained as group index interleaving and a typical interleaver used in channel coding may be used for such a group index interleaving.

For example, when a co-prime interleaver is used as the interleaver, a subcarrier group index of the k-th subcarrier included in the subchannel $\beta$ changes into $\Pi(k)$, which can be expressed by Equation (8).

$$\Pi(k)=(a^*k+\beta) \mod(Q-1) \text{ for } \beta=0, \ldots, Q-2$$

$$\Pi(k)=(b^*k+\beta) \mod(Q-1) \text{ for } \beta=Q-1 \quad (8)$$

In equation (8), each of a and b should be an integer prime to (Q−1), i.e., an integer having a greatest common measure of 1 with respect to (Q−1). Further, the same effect can be obtained even when the subchannel $\beta$ and the variable k exchange their functions in Equation (8).

Figure 5:
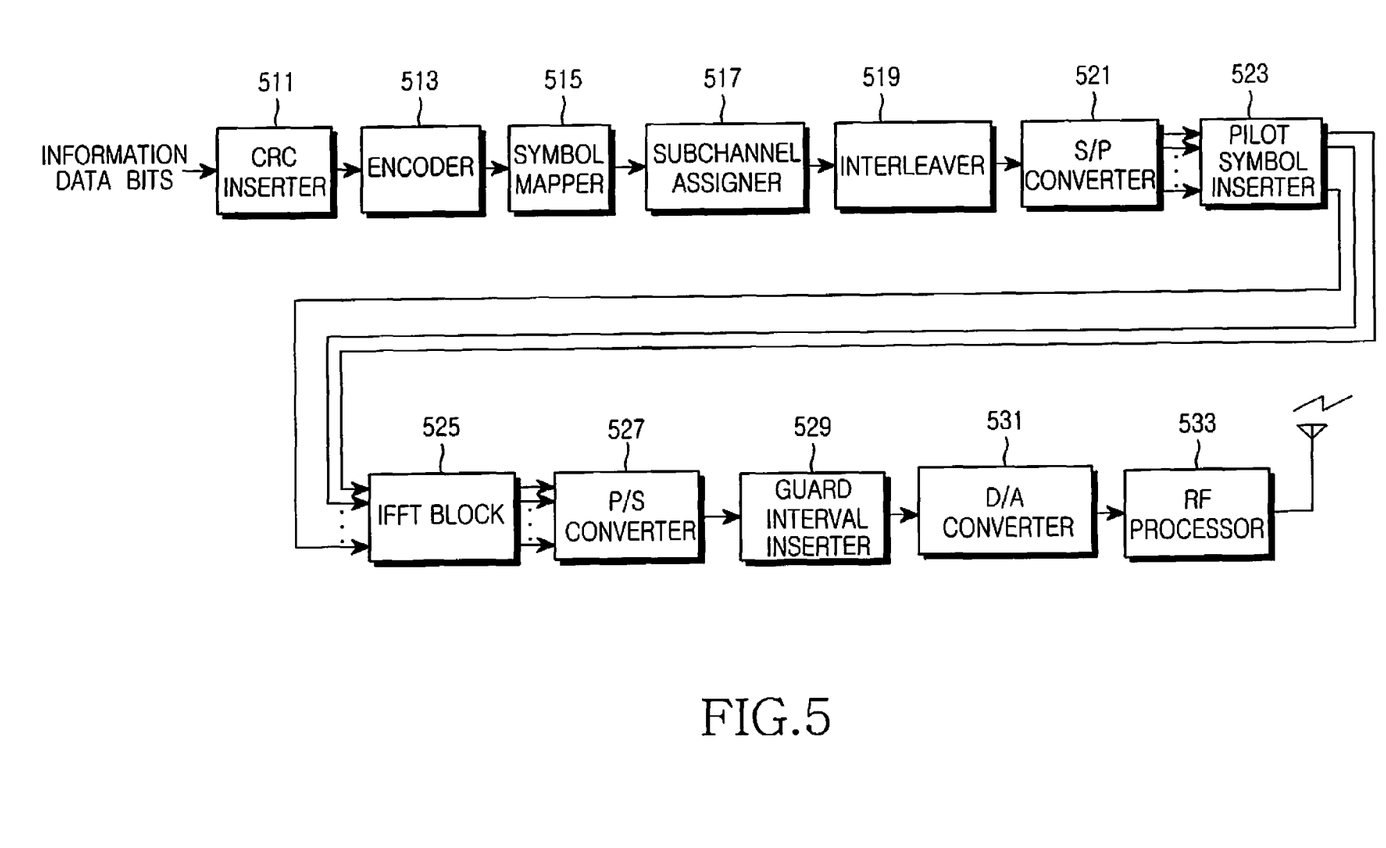
FIG. 5 is a block diagram illustrating a second transmitter in an OFDMA communication system according to another embodiment of the present invention.

FIG. 5 is a block diagram illustrating a second transmitter in an OFDMA communication system according to an embodiment of the present invention. Referring to FIG. 5, a second transmitter of the OFDMA communication system includes a CRC inserter 511, an encoder 513, a symbol mapper 515, a subchannel assigner 517, an interleaver 519, a serial-to-parallel converter 521, a pilot symbol inserter 523, an IFFT block 525, a parallel-to-serial converter 527, a guard interval inserter 529, a digital-to-analog converter 531, and an RF processor 533. The CRC inserter 511, the encoder 513, the symbol mapper 515, the serial-to-parallel converter 521, the pilot symbol inserter 523, the IFFT block 525, the parallel-to-serial converter 527, the guard interval inserter 529, the digital-to-analog converter 531, and the RF processor 533 have the same constructions as those of the CRC inserter 111, the encoder 113, the symbol mapper 115, the serial-to-parallel converter 119, the pilot symbol inserter 121, the IFFT block 123, the parallel-to-serial converter 125, the guard interval inserter 127, the digital-to-analog converter 129, and the radio frequency processor 131, so detailed description of them will be omitted here.

However, in the second transmitter shown in FIG. 5, the subchannel assigner 517 may change the subcarrier groups of the subcarriers constituting the subchannel whenever it assigns the subchannel, in order to acquire the desired diversity gain. Otherwise, the subchannel assigner 517 may assign the subchannel in the same way as that by the subchannel assigner 117 of FIG. 1 and the interleaver 519 may interleave the indexes of the subcarrier groups of the subcarriers constituting the subchannel assigned by the subchannel assigner 517.

As is understood from the foregoing description, the present invention enables subchannel assignment for maximizing the number of identifiable base stations in the OFDMA communication system. In addition, the subchannel assignment according to the present invention prevents a reduction in system performance due to the subchannel collisions by minimizing a collision rate between the subchannels between neighbor base stations. Furthermore, the present invention maximizes efficiency for cell search and channel estimation by using some of the assigned subchannels as pilot channels. Moreover, the present invention can acquire diversity gain by changing the subcarrier groups of the subcarriers constituting a subchannel whenever the subchannel is assigned.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of assigning subchannels by a transmitter in a communication system, the method comprising:
   dividing, by the transmitter, an entire frequency band into m subcarrier groups;
   mapping, by the transmitter, each of the m subcarrier groups to a subcarrier group index, wherein a subchannel includes n subcarriers selected from each of the m subcarrier groups corresponding to a subcarrier group index sequence,
   determining, by the transmitter, that a first data is needed to transmit in a first timing point; and
   assigning, by the transmitter, a first subchannel in the first timing point using a first subcarrier group index sequence,
   wherein the first subcarrier group index sequence is different from a second subcarrier group index sequence used for assigning a second subchannel in a second timing point, and
   wherein the first subcarrier group index sequence is generated by interleaving corresponding to:

$$\Pi(k)=(a*\beta+k)\mod(Q-1) \text{ for } \beta=0,\ldots,Q-2,$$

where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

2. The method of claim 1, wherein the first data is identical to a second data transmitted in the second timing point and the first data is retransmitted after transmitting the second data.

3. The method of claim 1, wherein the first subcarrier group index sequence is generated by interleaving corresponding to:

$$\Pi(k)=(b*\beta+k)\mod(Q-1) \text{ for } \beta=Q-1,$$

where b represents an integer, and each of a and b has a greatest common measure of 1 with respect to (Q−1).

4. The method of claim 1, wherein the first subcarrier group index sequence is equal to a sequence generated by cyclic-shifting the second subcarrier group index sequence.

5. A method of receiving data by a receiver in a communication system, the method comprising:
   dividing, by the receiver, an entire frequency band into m subcarrier groups;
   mapping, by the receiver, each of the m subcarrier groups to a subcarrier group index, wherein a subchannel includes n subcarriers selected from each of the m subcarrier groups corresponding to a subcarrier group index sequence; and
   receiving, by the receiver, data using a first subchannel,
   wherein the first subchannel is assigned in a first timing point using a first subcarrier group index sequence by a transmitter, when the transmitter determines that a first data is to be transmit in the first timing point, the first subcarrier group index sequence being different from a second subcarrier group index sequence used for assigning a second subchannel in a second timing point by the transmitter, and
   wherein the first subcarrier group index sequence is generated by interleaving corresponding to:

$$\Pi(k)=(a*\beta+k)\mod(Q-1) \text{ for } \beta=0,\ldots,Q-2,$$

where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

6. The method of claim 5, wherein the first data is identical to a second data transmitted in the second timing point and the first data is retransmitted after transmitting the second data.

7. The method of claim 5, wherein the first subcarrier group index sequence is generated by interleaving corresponding to:

$$\Pi(k)=(b*\beta+k)\mod(Q-1) \text{ for } \beta=Q-1,$$

where b represents an integer, and each of a and b has a greatest common measure of 1 with respect to (Q−1).

8. The method of claim 5, wherein the first subcarrier group index sequence is equal to a sequence generated by cyclic-shifting the second subcarrier group index sequence.

9. An apparatus for assigning subchannels in a communication system, the apparatus comprising:
   a subchannel assigner for assigning a first subchannel in a first timing point using a first subcarrier group index sequence when a transmitter determines that a first data is to be transmitted in the first timing point,
   wherein an entire frequency band is divided into m subcarrier groups, each of the m subcarrier groups is mapped to a subcarrier group index, a subchannel includes n subcarriers selected from each of the m subcarrier groups corresponding to a subcarrier group index sequence,
   wherein the first subcarrier group index sequence is different from a second subcarrier group index sequence used for assigning a second subchannel in a second timing point, and
   wherein the first subcarrier group index sequence is generated by interleaving corresponding to:

$$\Pi(k)=(a*\beta+k)\mod(Q-1) \text{ for } \beta=0,\ldots,Q-2,$$

where $\Pi(k)$ represents an interleaving formula, $\beta$ represents a subchannel index of the first subchannel, k represents locations of the subcarriers included in the first subchannel, a represents an integer, and (Q−1) represents a number of subcarriers in each subchannel.

10. The apparatus of claim 9, wherein the first data is identical to a second data transmitted in the second timing point and the first data is retransmitted after transmitting the second data.

11. The apparatus of claim 9, wherein the first subcarrier group index sequence is generated by interleaving corresponding to:

$$\Pi(k)=(b*\beta+k)\mod(Q-1) \text{ for } \beta=Q-1,$$

where b represents an integer, and each of a and b has a greatest common measure of 1 with respect to (Q−1).

12. The apparatus of claim 9, wherein the first subcarrier group index sequence is equal to a sequence generated by cyclic-shifting the second subcarrier group index sequence.

13. An apparatus for receiving data in a communication system, the apparatus comprising:

a receiver for receiving a data using a first subchannel, wherein when an entire frequency band is divided into m subcarrier groups, each of the m subcarrier groups is mapped to a subcarrier group index, a subchannel includes n subcarriers selected from each of the m subcarrier groups corresponding to a subcarrier group index sequence, wherein the first subchannel is assigned in a first timing point using a first subcarrier group index sequence by a transmitter when the transmitter determines that a first data is to be transmit in the first timing point, wherein the first subcarrier group index sequence is different from a second subcarrier group index sequence used for assigning a second subchannel in a second timing point by the transmitter, and wherein the first subcarrier group index sequence is generated by interleaving corresponding to:

$$\Pi(k)=(a*\beta+k) \bmod (Q-1) \text{ for } \beta=0,\ldots,Q-2,$$

where $\Pi(k)$ represents an interleaving formula, $\beta$ represents a subchannel index of the first subchannel, k represents locations of the subcarriers included in the first subchannel, a represents an integer, and $(Q-1)$ represents a number of subcarriers in each subchannel.

14. The apparatus of claim 13, the first data is identical to a second data transmitted in the second timing point and the first data is retransmitted after transmitting the second data.

15. The apparatus of claim 13, wherein the first subcarrier group index sequence is generated by interleaving corresponding to:

$$\Pi(k)=(b*\beta+k) \bmod (Q-1) \text{ for } \beta=Q-1,$$

where b represents an integer, and each of a and b has a greatest common measure of 1 with respect to $(Q-1)$.

16. The apparatus of claim 13, wherein the first subcarrier group index sequence is equal to a sequence generated by cyclic-shifting the second subcarrier group index sequence.

17. A method of assigning subchannels by a transmitter in a wireless communication system, the method comprising:

generating, by the transmitter, subcarrier groups by classifying subcarriers;

interleaving, by the transmitter, at least one of the subcarrier group corresponding to a predetermined interleaving formula;

constituting, by the transmitter, a subchannel using the interleaved subcarrier group; and assigning, by the transmitter, the constituted subchannel for transmission, wherein the predetermined interleaving formula is expressed as:

$$\Pi(k)=(a*\beta+k) \bmod (Q-1) \text{ for } \beta=0,\ldots,Q-2,$$

where $\beta$ represents a subchannel index, k represents locations of the subcarriers included in $\beta$ subchannel, a represents an integer, and $(Q-1)$ represents a number of subcarriers in each subchannel.

18. The method of claim 17, wherein the predetermined interleaving formula is expressed as:

$$\Pi(k)=(b*\beta+k) \bmod (Q-1) \text{ for } \beta=Q-1,$$

where b represents an integer, and each of a and b represents an integer having a greatest common measure of 1 with respect to $(Q-1)$.

19. An apparatus for assigning subchannels in a wireless communication system, the apparatus comprising:

a subchannel assigning means for generating subcarrier groups by classifying subcarriers, constituting a subchannel using at least one interleaved subcarrier group, and assigning the constituted subchannel for transmission; and an interleaving means for interleaving at least one subcarrier group among the generated subcarrier groups corresponding to a predetermined interleaving formula, wherein the predetermined interleaving formula is expressed as:

$$\Pi(k)=(a*\beta+k) \bmod (Q-1) \text{ for } \beta=0,\ldots,Q-2$$

where $\beta$ represents a subchannel index, k represents locations of the subcarriers included in $\beta$ subchannel, a represents an integer, and $(Q-1)$ represents a number of subcarriers in each subchannel.

20. The apparatus of claim 19, wherein the predetermined interleaving formula is expressed as:

$$\Pi(k)=(b*\beta+k) \bmod (Q-1) \text{ for } \beta=Q-1$$

where b represents an integer, and each of a and b represents an integer having a greatest common measure of 1 with respect to $(Q-1)$.

* * * * *